Figure 1:
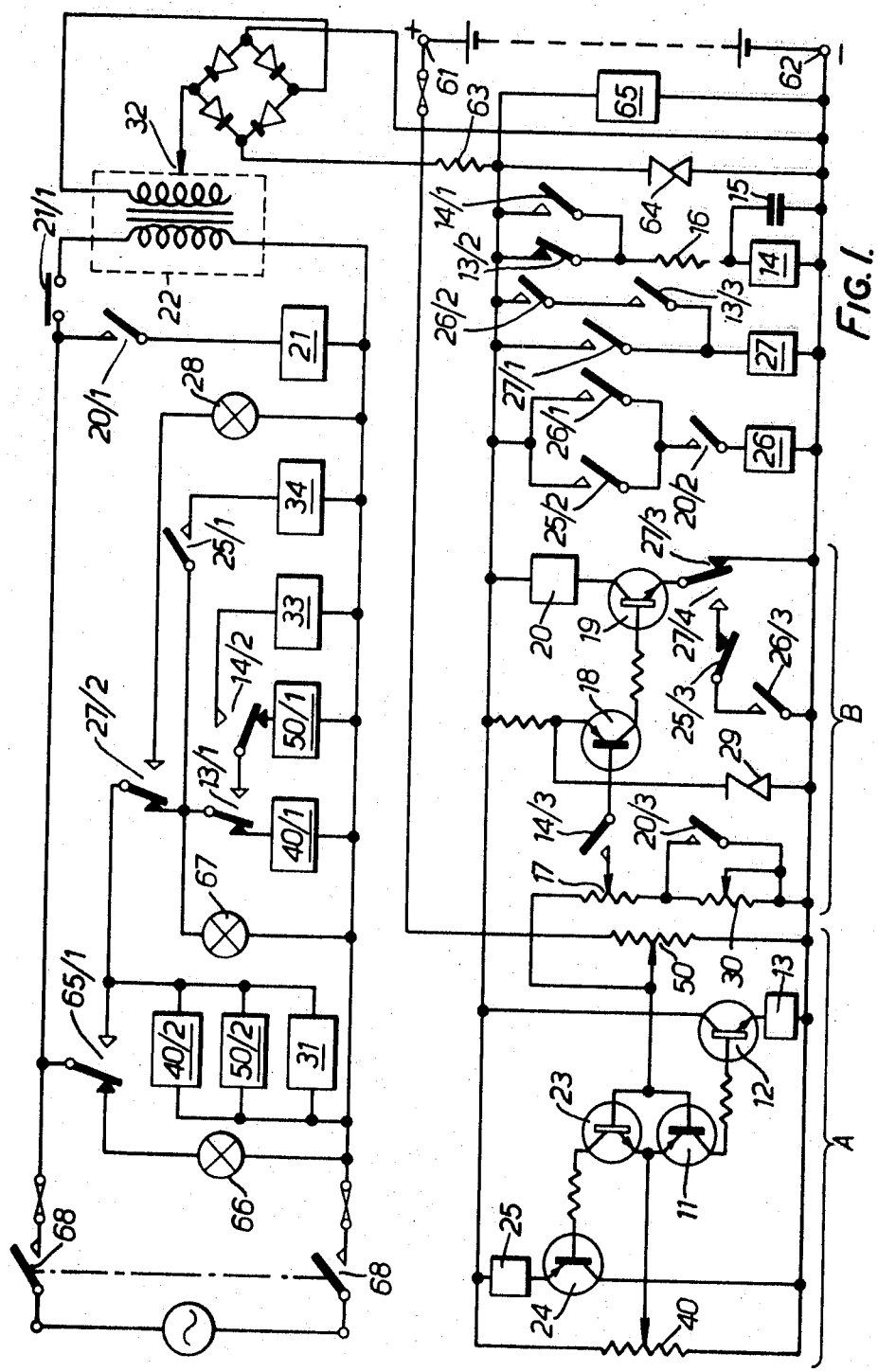

United States Patent
Clayton

[15] 3,660,748
[45] May 2, 1972

[54] BATTERY CHARGING CURRENT AND TERMINATION CONTROL CIRCUITRY

[72] Inventor: Dennis Albert Clayton, Gawsworth, England

[73] Assignee: Legg (Industries) Limited, Wolverhampton, England

[22] Filed: Mar. 2, 1970

[21] Appl. No.: 15,627

[30] Foreign Application Priority Data

Mar. 3, 1969 Great Britain..........................1,160/69

[52] U.S. Cl.....................................320/39, 320/23, 320/32, 320/43
[51] Int. Cl..........................................................H02j 7/04
[58] Field of Search.....................320/23, 24, 27, 28, 32, 33, 320/39, 40, 43

[56] References Cited

UNITED STATES PATENTS

| | | | |
|---|---|---|---|
| 3,040,229 | 6/1962 | Lapuyade | 320/51 X |
| 3,130,359 | 4/1964 | Sherwood | 320/51 |
| 3,217,225 | 11/1965 | Gottlieb et al. | 320/40 |
| 3,348,118 | 10/1967 | Watrous | 320/40 |
| 3,412,308 | 11/1968 | Brown | 320/TD UX |
| 3,424,969 | 1/1969 | Barry | 320/23 X |
| 3,447,059 | 5/1969 | Ford et al. | 320/TD UX |
| 3,517,294 | 6/1970 | Ruben | 320/24 |

Primary Examiner—William M. Shoop, Jr.
Attorney—Watson, Cole, Grindle & Watson

[57] ABSTRACT

To reduce the charging current in the latter part of a charge, an automatic battery-charging apparatus includes means for comparing a sample voltage depending on the battery voltage while on charge, with a reference voltage which is progressively increased throughout the charge, and using a function of the difference to control the charging current. Thus if the battery voltage and sample voltage increase more rapidly than the reference voltage, the charging current is reduced and vice versa. The reference voltage may be supplied by a motor-driven potentiometer, or by a progressivley charged capacitor. The duration of the charge is also controlled so that a phase of the charge is terminated when the value or rate of change of the sample voltage, having exceeded that of the reference voltage, then falls below it.

29 Claims, 2 Drawing Figures

FIG. I.

BATTERY CHARGING CURRENT AND TERMINATION CONTROL CIRCUITRY

This invention relates to automatic electric battery charging apparatus.

According to the present invention automatic electric battery charging apparatus includes a charging supply and means responsive to a function of the cell voltage on charge for progressively reducing the effective voltage of the charging supply as the charge proceeds.

Conveniently the apparatus may include means for establishing a reference voltage, means for comparing the reference voltage with a sample voltage which is a function of the battery voltage while on charge to derive an error signal, and reducing the effective voltage of the charging supply in accordance with the error signal. The means for establishing the reference voltage may be arranged to progressively increase it during a charging cycle.

Thus in one form of the invention automatic electric battery charging apparatus includes means for establishing a reference voltage and progressively increasing it during a charging cycle, means for comparing the reference voltage with a sample voltage which is a function of the battery voltage while on charge to derive an error signal corresponding to a function of the difference between the rate of change of the sample voltage and that of the reference voltage, and means for decreasing the battery charging current when the error signal is positive.

Under many conditions the usefulness of an electric storage battery could be greatly increased if it were possible to charge it more rapidly. For example in the case of a battery-driven vehicle it is normally the case that not only the battery but also the vehicle is out of service during the periods required for charging. With conventional chargers it is seldom possible to fully charge a discharged battery in less than about 10 hours and frequently a longer period is required. This period could be reduced by increasing the charging current but the charging current that can be tolerated without damaging the battery is strictly limited and decreases sharply as the battery reaches a fully charged condition.

Some reduction of charging current occurs almost inevitably during the charge due to the rise of voltage of the battery itself. Thus if the battery were connected to a constant voltage source the charging current would be equal to the difference between the source voltage and the cell voltage divided by the total effective resistance of the complete circuit including both the battery and the charger. In practice the fall of charging current produced in this way is quite insufficient to achieve the reduction of charging time aimed at, and in any event may not vary with the state of charge in the required manner.

By using the pattern of increase of the cell voltage as a yardstick for controlling the operation of an adjusting device, by which the effective voltage of the charger and hence the charging current is reduced during the charge, the present invention enable the period required for completely charging a discharged battery to be substantially reduced without damaging the battery.

The arrangement in accordance with the invention may also be employed to provide a signal for the termination of the charge or a phase of it. Thus if a reference voltage is established and is progressively increased during the course of the charge, and if a sample voltage which is a function of the battery voltage while on charge is compared with the reference voltage, and the charging current is decreased whenever the sample voltage increases more rapidly so as to tend to overtake the reference voltage, and vice versa, the charging current will follow a characteristic variation during the charge. Thus initially the rate of change of the cell voltage, (and hence the sample voltage) at constant charging current would be relatively slow and the charging current may be increased so as to make the sample voltage as far as possible keep pace with the reference voltage. In practice during the main or initial parts of the charge the current may remain substantially constant at the maximum of which the supply is capable. When gassing begins towards the end of the charge, the cell voltage rises more rapidly and the sample voltage would tend to overtake or outstrip the reference voltage if the charging current were kept constant and accordingly the charging current is reduced. In fact the reduction may be very considerably for example from between 25 and 50 percent of the capacity of the cell in ampere hours to about 5 percent. Finally, when the cell is fully charged, its voltage ceases to rise further, and in order to make the sample voltage keep pace with the reference voltage the charging current would have to be increased again. This point can be employed in accordance with one form of the invention to provide a signal for the charge, or a phase of it, to be terminated.

Thus according to one form of the invention automatic electric battery charging apparatus includes means for establishing a reference voltage and progressively increasing it during a charging cycle, means for comparing the reference voltage with a sample voltage which is a function of the battery voltage while on charge to derive an error signal corresponding to a function of the difference between the rate of change of the sample voltage and that of the reference voltage, means for decreasing the battery charging current when the error signal is positive and vice versa, and means for interrupting or modifying the battery charging circuit, to terminate the charge or a phase of it, when the value or rate of change of the error signal is negative after having previously been positive.

The error signal may correspond to the difference between the rates of change of the sample voltage and the reference voltage. On the other hand if the sample voltage is initially below the reference voltage and its rate of increase exceeds that of the reference voltage it will in due course overtake the reference voltage. Thus the error signal may if desired correspond to the difference between the values of the sample voltage and the reference voltage.

In the latter case the charge may be terminated when the sample voltage falls below the reference voltage, having previously exceeded it, i.e. when the error signal, corresponding to the difference between them, becomes negative having previously been positive.

Alternatively, if the sample voltage at all times exceeds the reference voltage, the charge may be terminated when the error signal, again corresponding to the difference between them, begins to decrease having previously increased, that is to say the rate of change of the error signal becomes negative after having previously been positive.

If a discharged battery is put on to charge at a constant current the battery voltage while on charge generally increases quite slowly throughout the major part of the charge. Towards the end of the charge gassing takes place and the voltage rise is much more rapid, and finally, when the battery is substantially fully charged, the rate of rise falls off again. The present invention can be arranged to make use of this behavior to signal the fact that the battery is substantially fully charged. At the same time the invention also adjusts the charging current so as to cause the rise of battery voltage to follow more or less closely that of a reference voltage. This means that the change in rates of rise of battery voltage will be less marked than if the charging current where kept constant, but they will still conform to the pattern referred to above, that is to say the rate of rise will increase during the gassing period and decrease again thereafter.

In one form of the invention the reference voltage is established and progressively increased by a motor-driven potentiometer. The control of the battery charging current may be dependent upon a comparator circuit responsive to a difference between the sample voltage and the reference voltage.

In an alternative form of the invention the reference voltage is established and progressively increased by a capacitor which is charged from the sample voltage. Thus in this form of the invention automatic battery charging apparatus includes a reference capacitor to provide a progressively increasing reference voltage during a charging cycle by being charged form a sample voltage which is a function of the battery voltage while on charge, the capacitor charging current being dependent upon the difference between the sample voltage and the reference voltage, means for decreasing the battery charging current when the capacitor charging current increases and vice versa, and means for interrupting or modifying the battery charging circuit to terminate the charge, or a phase of it, when the reference capacitor charging current falls, after having previously risen, as the battery approaches the fully charged condition. It may be desirable to provide delay means to prevent termination of the charge or a phase of it when the reference capacitor charging current rises and then falls at the beginning of the charging cycle.

The battery charging current may be adjusted by a motor-driven tap-changing transformer supplying the charging current through a rectifier. Alternatively it may be adjusted by a saturable reactor controlling the AC input to a rectifier supplying the battery charging current, or by varying the average output of a thyristor-controlled or similar rapidly pulsing circuit.

The termination of the charge, or a phase of it may be dependent upon the simultaneous operation of an operating relay and a memory relay, whereof the latter is energized when the former is not and is provided with a holding circuit so as to remain energized when the operating relay is subsequently energized again.

Where the apparatus is designed for charging batteries which will always be of the same nominal voltage, the sample voltage may be the same as the battery voltage. Alternatively manual means may be provided for adjusting the relationship between the sample voltage and the battery voltage to cater for batteries of different voltages. If desired means, such as a motor-driven potentiometer, may be provided for automatically adjusting the sample voltage to a given initial value to cater for batteries of difference voltages. The adjustment of the sample voltage may be effected after the battery has been connected to the apparatus but before the charging current is switched on.

Figure 2:
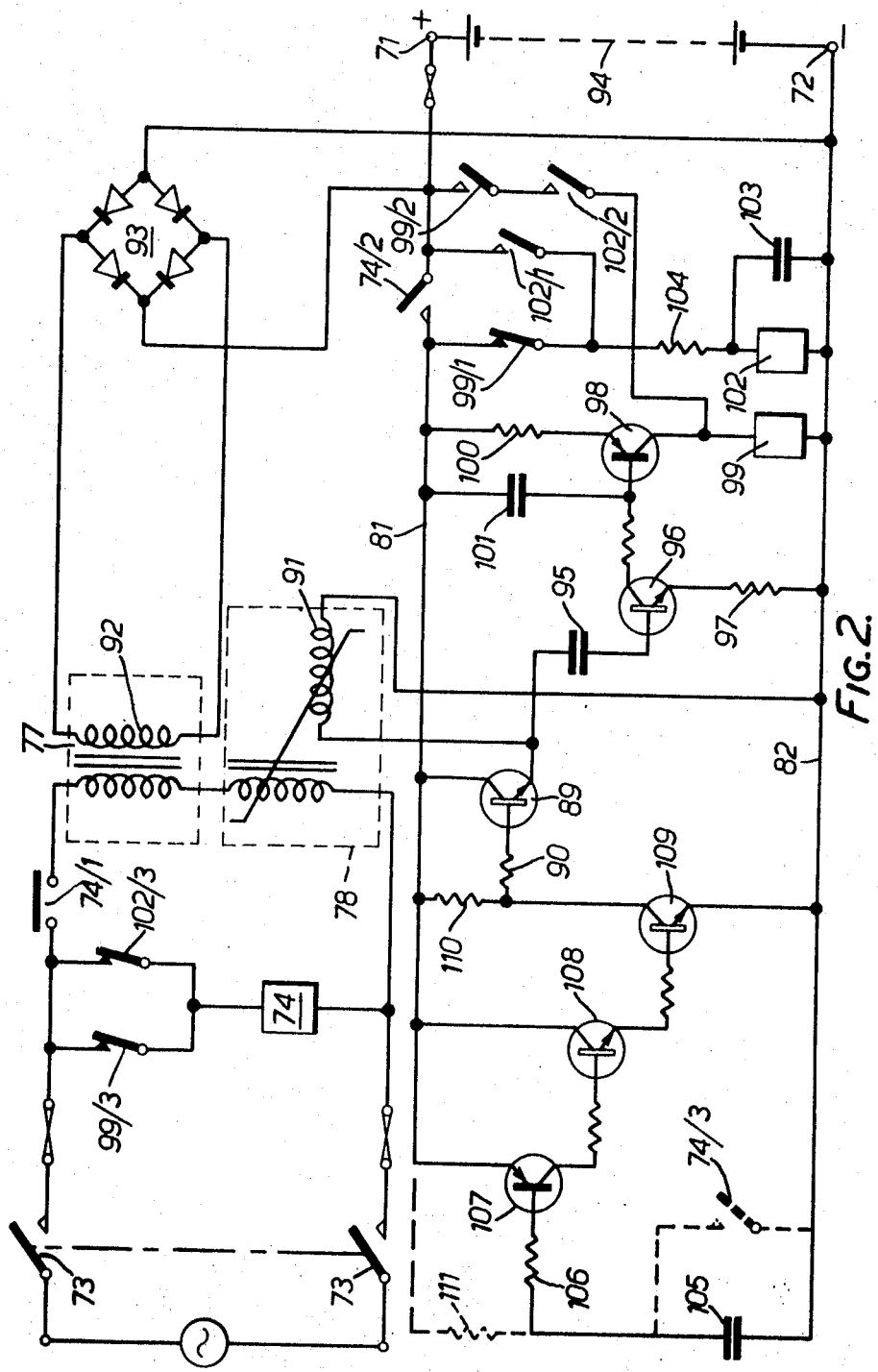

Further features and details of the invention will be apparent from the following description of two specific embodiments, which will be given by way of example, with reference to the accompanying drawings, in which:

FIGS. 1 and 2 are respectively circuit diagrams of the two arrangements.

It will be seen that the control circuit shown in the lower part of FIG. 1 comprises a voltage matching circuit shown on the left and indicated by the bracket A, a voltage comparator circuit shown in the middle and indicated by the bracket B, and a number of relays and contacts shown on the right of the diagram. The voltage matching circuit comprises a motor-driven potentiometer 40 serving to tap off a reference voltage from a constant voltage of a zener diode 64, and a motor-driven sampling potentiometer 50 serving to tap off a sample voltage from the voltage of the battery. Thus it will be appreciated that the sample voltage can be increased either by shifting the sampling potentiometer 50 or by increasing the charging current, and in any event the voltage will increase slowly as the battery becomes charged. The reference voltage is compared with the sample voltage by two pairs of transistors 11 and 12 and 23 and 24 arranged so that when the sample voltage exceeds the reference voltage the transistors 23 and 24 will conduct and a "decrease" relay 25 will be energized, but when the sample voltage falls short of the reference voltage the transistors 11 and 12 will conduct and an "increase" relay 13 will be energized.

It is believed that the remainder of the circuit of FIG. 1 will be clear from the diagram and the following description of its operation.

Briefly the operation occurs in four phases. The first phase, before charging actually begins, is a preadjusting one during which a sample voltage, which will be proportional to the battery voltage, is adjusted to a given value irrespective of the nominal voltage of the battery, to cater for batteries having different numbers of cells. The second phase is the main charging phase during which the reference voltage increases gradually and the charging current is correspondingly increased to make the sample voltage keep pace with the reference voltage. The third phase begins when (with the onset of gassing) the battery voltage begins to rise more rapidly and the sample voltage tend to outstrip the reference voltage, and the charging current is correspondingly reduced to match the reference voltage.

Finally when the rise of battery voltage flattens out and the sample voltage again falls short of the reference voltage the main charge is terminated and the fourth phase begins. In the fourth phase an intermittent boosting charge is provided whenever the open circuit battery voltage falls below a given value, and continues until the battery voltage on charge reaches a given higher value.

The operation will now be described in more detail.

Phase 1

When a battery is connected to the positive and negative terminals 61 and 62 the current flowing through the resistor 63 and zener diode 64 provides a constant voltage source for the DC control circuits including a number of relays and transistors.

A battery relay 65 is energized whenever a battery is connected, and changes over a contact 65/1 in the AC circuit to extinguish a red indicator lamp 66 and illuminate an amber lamp 67 through a normally closed contact 27/2. At the same time motor-driven potentiometer clutches 40/2 and 50/2 and amps clutch 31 are energized through the contact 65/1.

The motor-driven potentiometer 40 has been returned to an initial position in which it taps off a small positive reference voltage while the motor-driven potentiometer 50 has been returned to an initial position in which the slider is at the negative end giving a zero sample voltage. Accordingly the reference voltage exceeds the sample voltage, and the transistor 11 conducts, causing the transistor 12 to conduct and energize the increase relay 13. Contact 13/1 changes over to isolate the motor 40/1 and energize the motor 50/1 which drives the sampling potentiometer 50 so as to increase the sample voltage until it equals the reference voltage tapped off by the potentiometer 40, whereupon the relay 13 is de-energized Thus during the first or pre-adjusting phase the potentiometer 50 is driven until the sampling voltage balances the initial reference voltage, irrespective of the number of cells in the battery connected to the charging circuit. Thus phase 1 adjusts the circuit to suit batteries of different voltages. Once this has been done the sampling potentiometer 50 is never shifted again throughout the remainder of the charging cycle.

Phase 2

The de-energization of the relay 13 closes a contact 13/2 in series with a phase 2 relay 14 which is in series with a resistor 16 and shunted by a capacitor 15 to give it a delay action and ensure that it is not energized at the outset before the relay 13. The relay 14 then holds through its own holding contact 14/1, and its contact 14/2 changes over to disconnect the potentiometer motor 50/1 and connect the increase motor 33. Its contact 14/3 closes to connect the potentiometer 17 to the base of a transistor 18. This forms part of the comparator circuit B which, as described in connection with phase 4 below, serves to compare the sample voltage of the potentiometer 50 with the constant voltage of a zener diode 29. The potentiometer 17 is pre-adjusted so as to cause the transistor 18 to conduct when the voltage at 17 is less than about 5 percent above the initial reference voltage at the potentiometer 40 to which the sample voltage at 50 is now equal. Since the voltage of a discharged battery is approximately 2.1 volts per cell the transistor 18 will switch on whenever the battery voltage subsequently is less than approximately 2.2 volts per cell (with the contactor relay 20 de-energized and no charging current flowing).

Thus when the contact 14/3 closes, the battery voltage being approximately 2.1 volts per cell, that is to say less than 2.2 volts per cell, the transistor 18 will conduct and cause the transistor 19 to conduct and energize the contactor relay 20 which closes its contact 20/1 energizing the contactor 21 which closes its contact 21/1 and connects the transformer 22 to the AC mains so as to switch on the charging current. At the same time, the contact 20/3 closes, short circuiting the pre-set resistor 30 in series with the potentiometer 17, which ensures that the transistors 18 and 19 will remain conducting so long as the voltage at the battery terminals is below approximately 3.2 volts per cell.

It may be mentioned at this point that this ensures that if at any time the battery is disconnected from the charger the transistors 18 and 19 will cut off, de-energizing the contactor relay 20 and the contactor 21 so as to switch off the AC supply.

The reference voltage is slowly but steadily increased at a predetermined uniform or average rate of approximately 5 percent per hour or approximately 0.1 volt per cell per hour, by the potentiometer 40 which is driven by the motor 40/1, and the matching circuit A controls the increase motor 33 and the decrease motor 34 which drive the secondary tap 32 of the tap changing transformer 22 so as to increase or decrease the charging current and hence increase or decrease the voltage of the battery on charge and cause the sample voltage to match the reference voltage.

Thus during the second phase the transistors 11 and 12 conduct and the increase relay 13 is energized whenever the sample voltage falls short of the reference voltage by a given amount, whereupon the increase relay causes the increase motor 33 to increase the charging current and therefore the battery voltage and the sample voltage.

Other rates of increase may of course be chosen according to the desired total charge duration, provided that the predetermined rate of increase of voltage is not so great as to cause excessive currents to flow. Predetermined rate of increase from approximately 0.05 to 0.2 volt per cell per hour will cover most battery charging requirements, corresponding to recharge times between approximately 13 hours and 3¼ hours respectively.

During the initial part of the charge the voltage of the battery on charge rises relatively slowly, so that the sample voltage of the potentiometer 50 will be left behind by the reference voltage of the potentiometer 40 if the charging current remains constant (the position of the potentiometer 50 remaining undisturbed as already mentioned). Thus as soon as the reference voltage at the potentiometer 40 exceeds the sample voltage at the potentiometer 50 by a very small amount, the transistor 11 will again conduct, energizing the increase relay 13 whose contact 13/1 is now connected through the contact 14/2 to the increase motor 33 which is accordingly energized to drive the secondary tap 32 of the tap changing transformer 22 to increase the charging current. This increases the sample voltage and the transistor 11 cuts off again, de-energizing the relay 13. While the increase motor 33 is being driven the motor 40/1 is momentarily switched off by the contact 13/1 but starts again as soon as the increase motor is switched off.

Thus so long as the battery voltage tends to lag behind the increasing reference voltage the charging current is caused to increase in a series of steps.

In practice the reference voltage is so chosen that with a fully discharged battery the sample voltage will not overtake the reference voltage even when the charging current is adjusted to the maximum value of which the charger is capable. Accordingly in these circumstances the charging current, after being switched on, will be steadily increased to the maximum value of which the charger is capable, during a period of from perhaps half a minute to a few minutes, and thereafter will remain constant at this maximum value throughout the remainder of phase 2.

If however a partially charged battery should be put on to charge and would be liable to damage if subjected to the full charging current, the sample voltage will rise sufficiently rapidly to catch up the reference voltage and stop the increase of charging current before it reaches the full value referred to above, thereby avoiding damage to the battery.

Phase 3

The various relays shown on the right of FIG. 1 include a memory relay 26 in series with its own holding contact 26/1 which is shunted by a contact 25/2 of the decrease relay 25. Thus once the decrease relay has been energized, and has energized the memory relay, the latter will remain energized through its holding contact irrespective of the subsequent behavior of the decrease relay. A phase 4 relay 27 is energized through a contact 26/2 of the memory relay in series with a contact 13/3 of the increase relay so that when the increase relay 13 is energized any time after the memory relay has been energized, and is holding itself, the phase 4 relay 27 will be energized. The latter has a holding contact 27/1 so as to remain energized thereafter irrespective of the behavior of the relays 13 and 26. The phase 4 relay 27 has a normally closed contact 27/3 in series with a transistor 19 and a contactor relay 20 so that when the phase 4 relay is energized the contact 27/3 opens, de-energizing the contactor relay 20 which opens a contact 20/1 in series with the contactor 21 which is thereby de-energized so as to open its contact 21/1 in the main AC supply circuit to the transformer 22, thereby terminating the main charge.

Accordingly when the battery approaches the state of charge at which gassing begins, its voltage begins to rise more steeply and the rate of increase will soon exceed 0.1 volt per cell per hour or any other predetermined average rate corresponding to that at which the reference voltage has been caused to rise. Thus the sample voltage at the potentiometer 50 will then exceed the rising reference voltage at the potentiometer 40, causing the transistors 23 and 24 to conduct and energize the decrease relay 25 which closes its contact 25/1 energizing the decrease motor 34 to shift the secondary tap 32 of the tap-charging transformer 22 to reduce the charging current until the sample voltage is again down to the reference voltage.

At the same time the contact 25/2 energizes a memory relay 26 through a normally open contact 20/2 of the contactor relay 20 which is of course now energized. Since contact 25/1 is shunted by the holding contact 26/1 of the memory relay 26, the memory relay remains energized irrespective of the subsequent behavior of the decrease relay 25 once that relay has been energized.

So long as the battery voltage continues to rise at such a value that the sample voltage outstrips the reference voltage the decrease relay 25 will continue periodically to reduce the charging current progressively.

End of Phase 3

When the battery approaches the fully charged condition its rate of rise of voltage diminishes until it falls below the rate of 0.1 volt per cell per hour to which the rise of reference voltage corresponds. Thus the reference voltage soon overtakes the sample voltage and the increase relay 13 is again energized as previously described in an attempt to increase the charging current again. It will, however, be noted that the phase 4 relay 27 can be energized through contacts 26/2 and 13/3, of the memory relay 26 and increase relay 13 respectively. Accordingly since both these relays are both energized the phase 4 relay 27 will also be energized. It is provided with a holding contact 27/1 so that it thereafter remains energized irrespective of the behavior of the increase relay 13 and memory relay 26. The contact 27/2 changes over and isolates the AC supply 68 from the amber light 67 and the potentiometer motors 40/1 and 50/1 and the increase and decrease motors while the green lamp 28 is illuminated. In addition the contact 27/3 changes over and since the contact 26/3 of the memory relay is open the contactor relay 20 is de-energized opening its contact 20/1, de-energizing the contactor 21 which opens its contact 21/1 and stops the charge.

Thus phase 3 of the charge is terminated when the rise of battery voltage flattens out and the sample voltage again falls short of the reference voltage so that the transistors 11 and 12 again conduct and energize the increase relay 13.

Phase 4

The comparator circuit B, shown in the middle of the lower part of FIG. 1, is primarily provided for the fourth phase of the charge which provides an intermittent topping up charge which starts whenever the open circuit falls below a given value and terminates whenever the voltage on charge rises above the value at which the main charge was switched off. Thus the transistor 18 serves to compare a voltage tapped off from the sample voltage of the potentiometer 50 by means of the further potentiometer 17, with the voltage of a zener diode 29.

At the end of phase 3 the contact 20/2 opened releasing the memory relay 26 whose contact 26/3 closed. In addition the contact 20/3 closed so that the transistors 18 and 19 now cut off at any voltage above 2.2 volts per cell (rather than 3.2 volts per cell) in the case of a lead acid battery.

The open circuit battery voltage now gradually falls and when it reaches approximately 2.2 volts per cell the transistors 18 and 19 conduct, and, since the contacts 25/3 and 26/3 are closed, the contactor relay 20 and the contactor 21 will be energized to switch on the charging current again.

The charge is resumed at a current approximately equal to that which was flowing when the charge was cut off at the end of phase 3, since the secondary tap of the tap-changing transformer has not been subsequently shifted.

The contactor relay 20 is now energized through a normally closed contact 25/3 of the decrease relay 25 of the voltage matching circuit A, in series with the normally closed contact 26/3 of the memory relay 26 and the normally open contact 27/4 of the phase 4 relay 27.

When the voltage of the battery on charge rises above the value which it reached at the end of phase 3 the sample voltage at the potentiometer 50 exceeds the reference voltage at the potentiometer 40 so that the transistors 23 and 24 again conduct and energize the decrease relay 25. This opens its contacts 25/3 de-energizing the contactor relay 20 and contactor 21 and stopping the charge again.

The battery continues to receive pulses of charge initiated each time its open-circuit voltage falls to approximately 2.2 volts per cell and terminated each time its voltage on charge exceeds the maximum value reached at the end of phase 3.

The fourth phase, during which the battery is given a topping-up charge at intervals, continues indefinitely until the battery is disconnected or the supply switched off manually.

The same voltage comparator circuit B, adjusted to a different voltage setting by the contact 20/3, serves to switch off the charging current if at any time the voltage across the battery terminals should exceed a certain higher value, for example about 3.2 volts per cell. This gives the facility that if the battery is at any time unplugged while on charge the alternating current supply will at once be switched off automatically.

In addition to the normal sequence of operations the following additional features of the arrangement shown in FIG. 1 may be noted.

As already indicated if the battery is disconnected from the battery terminals 61 and 62 while charging current is flowing, the voltage across these terminals will rise to the equivalent of approximately 3.2 volts per cell or more. Thus the sample voltage will rise to a value at which the transistors 18 and 19 cut off, de-energizing the contactor relay 20 and the contactor 21, so as to switch off the AC supply 68 from the transformer 22. No DC supply is now available to the control circuits and all relays are released and the potentiometers 40 and 50 and the transformer secondary tap 32 return to their original positions ready for the next battery recharge.

If the AC supply is interrupted while a battery is connected to the terminals 61 and 62, all clutches 40/2, 50/2 and 31 are released and on restoration of the AC supply the control circuits follow a complete recharge sequence. In a modified arrangement the three clutches are connected across the DC supply provided by the zener diode 64, in which case the normal sequence of operations would be continued after restoration of the AC supply.

It will be appreciated that a number of the features provided in the arrangement of FIG. 1 are optional and may be omitted if not required. Thus one or more of the indicator lamps may be omitted and the switch contacts accordingly simplified. The automatic adjustment of the control circuits for different numbers of cells may be omitted and manual switching substituted, or alternatively each charger may be designed for only a single nominal battery voltage. The automatic increase of current in phase 2 from zero enables the equipment to deal automatically with any capacity of battery up to a maximum, but this automatic feature may be omitted and the initial output current may be selected manually, or again the equipment may be designed only for batteries of a certain capacity. Again the automatic shut down of the AC supply on disconnecting the battery may be omitted and a manual switch may be substituted. Finally the phase 4 intermittent charge may be omitted and the charge may be finally terminated at the end of phase 3. Alternatively the end of phase 3 may introduce a further charge for a stipulated timed period.

The circuit shown in FIG. 1 incorporates a motor-driven tap changing transformer 22 and motor driven potentiometers 40 and 50.

In the arrangement of FIG. 2 the tap changing transformer 22 is eliminated and the function of varying the charging current is performed by an ordinary transformer 77 in conjunction with a saturable reactor 78. In addition the motor-driven potentiometer 50 is eliminated by making no provision for automatic adjustment of the apparatus to suit batteries of different voltages, such adjustment being either made manually or omitted altogether. In addition the motor-driven potentiometer 40 is eliminated and the progressively rising reference voltage is provided by a reference capacitor 105 which is steadily charged.

For the rest it is believed that the arrangement of the circuit of FIG. 2 will be clear from the diagram and from the following description of its operation.

Phase 1 and Phase 2

Thus in FIG. 2 when a battery 94 has been connected to the positive and negative battery terminals 71 and 72, and the AC supply has been switched on by the manual switch 73 a main interrupting AC relay 74 is energized through normally closed contacts 99/3 and 102/3 and this causes a contact 74/1 to close and switch on the AC supply to the transformer 77 through the load winding of the saturable reactor 78.

The secondary winding 92 of the transformer 77 is connected to a rectifier bridge 93 whose output is connected to the battery terminals 71 and 72, so that the closing of the contact 74/1 results in a charging current flowing.

At the same time a contact 74/2 closes and switches on the DC supply from the battery terminals 71 and 72 to DC busbars 81 and 82 of the DC control circuit referred to below. Current from the positive busbar 81 flows through the emitter base path of a transistor 107 and through a resistor 106 to charge the reference capacitor 105.

The collector current of the transistor 107 is amplified by transistors 108 and 109 whereof the latter has its collector connected through a resistor 110 to the positive busbar 81 and through a resistor 90 to the base of a transistor 89. The control winding 91 of the saturable reactor 78 is connected across the battery busbars 81 and 82 through the emitter collector path of the transistor 89.

Thus the reference capacitor 105 is initially at zero voltage so that the currents in the transistors 107, 108 and 109 are relatively high, the voltage dropped by the resistor 110 is relatively high and the current in the transistor 89 and therefore in the saturable reactor control winding 91 is correspondingly low. Accordingly the inductance of the saturable reactor is at a maximum and the charging current of the battery is low.

As the capacitor 105 charges up, the current flowing to charge it falls and hence the battery charging current rises, causing a rise in battery voltage.

If the battery voltage were constant the voltage of the reference capacitor 105 would rise exponentially and would approach a constant value. The current in the transistor 107 and resistor 106 would fall correspondingly and approach zero and the current in the saturable reactor would approach a maximum value saturating the core and increasing the charging current to the maximum value for which the circuit is designed. In fact, however, the voltage of the battery is increasing so that the exponential rise of voltage of the reference capacitor 105 will be modified, and instead of approaching a constant value will approach a certain rate of rise, and if this is constant the currents through the transistor 107 and resistor 106 will become constant so that the battery charging current will also become constant.

At any time if the battery voltage tends to rise less steeply, the capacitor charging current through the transistor 107 will fall, causing a rise in battery charging current which in turn causes the battery voltage to rise more steeply. Conversely if the battery voltage tends to rise more steeply the capacitor charging current through the transistor 107 will rise, causing a fall in battery charging current which in turn causes the battery voltage to rise less steeply.

The variation of current in the control winding 91 of the saturable reactor 78, and hence of the battery charging current, is arranged to initiate the termination of the charge by means of the control circuit shown at the right of the lower part of FIG. 2 in the following manner.

The voltage across the control winding 91 is proportional to the current in it and hence to the battery charging current, and is applied to a differentiating capacitor 95 in series with a resistor 97 and the base-emitter path of a transistor 96, whereof the collector is connected through a resistor to the base of a transistor 98 which is also connected through a capacitor 101 to the positive busbar 81. The emitter of the transistor 98 is connected to the positive supply terminal through a resistor 100 whilst its collector is connected to the negative terminal through a relay winding 99 and is also connected to the positive battery terminal through a relay contact 102/2 in series with a relay contact 99/2 forming a holding circuit for the relay 99.

Thus so long as the current in the control winding 91 and the battery charging current are increasing at a rate greater than some predetermined rate, current will flow through the differentiating capacitor 95 and transistor 96 and resistor 97, thus switching on the transistor 98 and energizing the relay 99. The rate at which the charging current must increase in order to keep the relay 99 energized will depend upon the values and characteristics of the components 91, 95, 96, 97, 98, 99 and other associated components. The resistor 100 and capacitor 101 associated with the transistor 98 ensure that the operation of the relay 99 will not be affected by short period fluctuations in the charging current.

Thus the relay 99 operates very shortly after the AC supply is switched on and causes the contact 99/1 to open, thus preventing energization of the relay 102 which is delayed by a resistor 104 in series with it and a capacitor 103 in parallel with it.

Phase 3

When the battery voltage approaches the state of charge at which gassing begins, its its voltage begins to rise more steeply and as described above the current in the control winding 91 is reduced. When the current in the control winding 91 and the voltage across it become constant the current through the capacitor 95 and transistor 96 falls to zero and the transistors 96 and 98 stop conducting so that the relay 99 is de-energized The contact 99/1 is accordingly closed and the memory relay 102 is energized and closes its holding contact 102/1 as well as a contact 102/2 in the holding circuit of the relay 99 while a normally closed contact 102/3 opens in the supply line to the relay 74 which however remains energized through the contact 99/3.

End of Phase 3

When the battery approaches the fully charged state its rate of increase of voltage diminishes, so that, as described above, its charging current and the current in the control winding 91 begin to increase again. Accordingly the capacitor 95 again accepts a charging current and the transistors 96 and 98 conduct so that the relay 99 is again energized. This closes the contact 99/2 and holds the relay 99 since the contact 102/2 is already closed. The contact 99/1 opens but the memory relay 102 remains energized through its own holding contact 102/1.

Accordingly relays 99 and 102 are both energized together so that the contacts 99/3 and 102 are both energized together so that the contacts 99/3 and 102/3 through which the relay 74 is energized are both opened and the relay 74 is accordingly de-energized. Contact 74/1, therefore, opens, interrupting the AC supply, and the charge stops. The contact 74/2 also opens thus interrupting the DC supply to the busbars 81 and 82 but the relays 99 and 102 remain energized from the battery side of the contact 74/2 so long as the battery remains connected to the terminals 71 and 72, thus ensuring that the AC supply remains disconnected.

When the battery is required for use, the AC supply is switched off at the manual switch 73 and the battery is then disconnected from the terminals 71 and 72. The relays 99 and 102 are therefore de-energized so that all components are in their original state ready for the next battery recharge.

The values of the reference capacitor 105 and resistor 106 can be chosen in conjunction with the gain of the amplifier so that the charging current is continuously and automatically adjusted to maintain a particular rate of rise of battery voltage.

The capacitor 105 may be discharged to zero voltage ready for the next battery charge by providing a connection across it through a contact 74/3 (shown dotted) of the relay 74. Alternatively or in addition a resistor 111 (also shown dotted) may be provided between the reference capacitor 105 and the positive busbar 81 so as to shunt the resistor 106 and the base emitter path of the transistor 107, depending upon the circuit requirements of the latter. On disconnecting the battery the capacitor 105 would then discharge through the resistor 111 and the contact 99/1, resistor 104 and relay 102.

One or more of the additional features of the circuit shown in FIG. 1 may be incorporated in the circuit of FIG. 2 either directly or with suitable modifications. In particular a phase of intermittent charging similar to phase 4 of the arrangement of FIG. 1 may be incorporated, in order to charge the battery more fully and maintain it in a fully charged state until it is required for use.

The output current of most types of battery charging equipment hitherto employed is considerably affected by fluctuations in the AC mains input voltage. A fall in mains voltage often causes substantial fall in output current and the longer charging time which is then required may in inconvenient. On the other hand a rise in AC mains voltage causes a rise of output current which may overload the charger components and may overcharge the battery.

In an arrangement in accordance with the present invention, in which the charging current is continuously and automatically adjusted to maintain a predetermined rate of rise of battery voltage, the equipment provides immediate and automatic correction of the output current when fluctuations in the AC input voltage occur, and the charging time required remains substantially unaffected.

The final termination of a charge, or of a phase of the charge, in many conventional designs, is effected by means of relays which are set to operate at a particular battery voltage. Considerable care and the use of an accurate voltmeter are required when setting such relays, and the setting may often be inaccurate due to the difficulty of ensuring correct compensation for the voltage drop in the battery charging cables. In an arrangement in accordance with the present invention the behavior of the equipment is effectively controlled by the increasing reference voltage, which is obtained from a stabilized voltage source, and when the circuit has been set up by the manufacturer no further periodical resetting should be necessary in spite of changes in resistance of the battery charging cables.

In contrast to many conventional types of charger the present invention does not necessarily involve the inclusion of a timer for terminating a charge or a phase of charge, and errors which often arise due to incorrect setting of such timers may be eliminated.

In contrast to some current designs of charging equipment in which control is obtained by means of gas-detecting probes or temperature probes, the present invention involves no attachment to the battery other than the essential positive and negative charging cables, and all functions are initiated or terminated by applying the results of the analysis of changing behavior of the battery charging voltage and current with respect to time.

The invention has been specifically described as applied to a lead-acid battery, but it will be appreciated that it is not limited thereto. Thus with suitable modification to the voltage values, the system would be applicable to other battery types, including alkaline batteries, so long as the charging voltage curve at constant current has a final constant voltage portion preceded by a rising portion.

What we claim as our invention and desire to secure by Letters Patent is:

1. Automatic electric battery charging apparatus comprising means for establishing a reference voltage and progressively increasing it during a charging cycle, means for comparing the reference voltage with a sample voltage which is a function of the battery voltage while on charge to derive an error signal corresponding to a function of the difference between the rate of change of the sample voltage and that of the reference voltage, means for decreasing the battery charging current when the error signal is positive and increasing the battery charging current when the error signal is negative, and means for interrupting the battery charging circuit to terminate the charge for at least a part of said charging cycle when said error signal is negative after having previously been positive.

2. Apparatus as claimed in claim 1 in which the error signal corresponds to the difference between the rates of change of the sample voltage and the reference voltage.

3. Apparatus as claimed in claim 1 in which the error signal corresponds to the difference between the values of the sample voltage and the reference voltage.

4. Apparatus as claimed in claim 1 in which the charge is terminated when the sample voltage falls below the reference voltage.

5. Apparatus as claimed in claim 2 in which the sample voltage at all times exceeds the reference voltage, and the charge is terminated when the error signal begins to decrease having previously increased.

6. Automatic electric battery charging apparatus comprising a reference capacitor to provide a progressively increasing reference voltage during a charging cycle by being charged from a sample voltage which is a function of the battery voltage while on charge, the capacitor charging current being dependent upon the difference between the sample voltage and the reference voltage, means for decreasing the battery charging current when the capacitor charging current increases and increasing the battery charging current when the capacitor charging current decreases, and means for interrupting the battery charging circuit to terminate the charge for at least part of said charging cycle when the reference capacitor charging current falls, after having previously risen, as the battery approaches the fully charged condition.

7. Apparatus as claimed in claim 6 in which delay means are provided to prevent said termination of the charge when the reference capacitor charging current rises and then falls at the beginning of the charging cycle.

8. Automatic electric battery charging apparatus comprising charging means for generating an output to charge a battery, means for automatically adjusting said output during charging to increase the battery voltage to a datum value, and means for progressively increasing the datum value during at least a part of a charging cycle.

9. Apparatus as claimed in claim 8 further comprising means for establishing a reference voltage proportional to said datum value, means for progressively increasing said datum value during a charging cycle, means for comparing said reference voltage with a sample voltage proportional to the battery voltage during charging to derive an error signal which corresponds to a function of the difference between said sample voltage and said reference voltage, and means for varying said charging output in response to said error signal tending to cause the battery voltage to conform to the increases of said datum value.

10. Apparatus as claimed in claim 9 wherein said error signal also provides a signal for the termination of at least part of the charge cycle.

11. Apparatus as claimed in claim 9 wherein said means for varying the charging current is controlled by a comparator circuit responsive to a difference between the sample voltage and the reference voltage.

12. Apparatus as claimed in claim 9 wherein the reference voltage is established and progressively increased by a capacitor which is charged from the sample voltage.

13. Apparatus as claimed in claim 8 wherein the battery charging current is adjusted by a motor-driven tap-changing transformer supplying the charging current through a rectifier.

14. Apparatus as claimed in claim 8 wherein the battery charging current is adjusted by a saturable reactor controlling the A.C. input to a rectifier supplying the battery charging current.

15. Apparatus as claimed in claim 8 wherein the battery charging current is adjusted by varying the average output of a pulsing circuit.

16. Apparatus as claimed in claim 8 wherein the termination of the charge for at least part of said charging cycle is dependent upon the simultaneous operation of an operating relay and a memory relay, said latter relay is energized when said former relay is not energized and is provided with a holding circuit so as to remain energized when the operating relay is subsequently energized again.

17. Apparatus as claimed in claim 8 wherein the sample voltage is the same as the battery voltage for the charging of batteries of equal nominal voltages.

18. Apparatus as claimed in claim 8 wherein manual means is provided for adjusting the relationship between the sample voltage and the battery voltage for the charging of batteries each having different voltages.

19. Apparatus as claimed in claim 8 wherein means are provided for automatically adjusting the sample voltage to a given initial value for the charging of batteries each having different voltages.

20. Apparatus as claimed in claim 9 wherein the battery voltage and said sample voltage follow increases of said reference voltage up to a maximum charging output throughout the charging cycle.

21. Apparatus as claimed in claim 20 wherein said means for increasing said reference voltage operates at a predetermined maximum rate of increase.

22. Apparatus as claimed in claim 21 wherein the reference voltage is established and progressively increased by a motor-driven potentiometer.

23. Apparatus as claimed in claim 21 wherein said means for increasing the reference voltage is arrested by said error signal until said error signal has been reduced below a predetermined value.

24. Apparatus as claimed in claim 9 wherein said error signal corresponds to the difference between the values of said sample voltage and said reference voltage.

25. Apparatus as claimed in claim 9 wherein said error signal corresponds to the difference between the rates of change of said sample voltage and said reference voltage.

26. A method of automatically charging a battery comprising the steps of: charging said battery from apparatus providing a charging current, automatically adjusting the charging current to bring the battery voltage to a datum voltage value during charging, and progressively increasing said datum value during a charging cycle.

27. A method as claimed in claim 26 further comprising the step of adjusting said charging current to cause the battery voltage to follow increases of said datum value up to a maximum charging current throughout the charging cycle.

28. A method as claimed in claim 26 further comprising the step of selecting the initial datum value at the beginning of a charge cycle to exceed the initial battery voltage during charge at the maximum charging current of said apparatus.

29. A method as claimed in claim 27 further comprising the step of arresting the increasing of said datum value for a period terminated when said step of adjusting said charging current does not cause the battery voltage to be substantially equal to said datum value.

* * * * *